(12) United States Patent
Winter et al.

(10) Patent No.: US 7,014,699 B2
(45) Date of Patent: Mar. 21, 2006

(54) OXALKYLATION PRODUCTS PRODUCED FROM EPOXIDES AND AMINES AND THEIR USE IN PIGMENT PREPARATIONS

(75) Inventors: Martin Alexander Winter, Kelkheim (DE); Hans Joachim Metz, Darmstadt (DE); Andreas Harz, Schwalbach (DE); Andreas Pfrengle, Bingen (DE)

(73) Assignee: Clariant GmbH, Frankfurt (DE)

( * ) Notice: Subject to any disclaimer, the term of this patent is extended or adjusted under 35 U.S.C. 154(b) by 344 days.

(21) Appl. No.: 10/469,363

(22) PCT Filed: Feb. 26, 2002

(86) PCT No.: PCT/EP02/01989

§ 371 (c)(1),
(2), (4) Date: Aug. 26, 2003

(87) PCT Pub. No.: WO02/068504

PCT Pub. Date: Sep. 6, 2002

(65) Prior Publication Data

US 2004/0116562 A1    Jun. 17, 2004

(30) Foreign Application Priority Data

Feb. 28, 2001    (DE) ............................... 101 09 483

(51) Int. Cl.
C04B 14/00 (2006.01)
B01F 17/00 (2006.01)
C08G 73/00 (2006.01)
C08G 65/26 (2006.01)
C08L 63/02 (2006.01)

(52) U.S. Cl. ...................... 106/400; 516/198; 516/905; 516/920; 525/383; 525/523; 525/529; 525/530; 525/533; 525/540; 528/106; 528/119; 528/120; 528/121

(58) Field of Classification Search ...................... None
See application file for complete search history.

(56) References Cited

U.S. PATENT DOCUMENTS

| | | | |
|---|---|---|---|
| 2,505,486 A | 4/1950 | Green | 117/36 |
| 3,853,770 A | 12/1974 | Altschuler | 252/8.8 |
| 4,001,101 A | 1/1977 | Bosso et al. | 204/502 |
| 4,237,320 A | 12/1980 | Krapf et al. | 568/609 |
| 4,285,691 A | 8/1981 | Egli et al. | 8/455 |
| 4,316,032 A | 2/1982 | Bitterli | 548/109 |
| 4,411,665 A | 10/1983 | Egli et al. | 8/455 |
| 4,450,304 A | 5/1984 | Diery et al. | 568/609 |
| 4,566,963 A | 1/1986 | Ott et al. | 204/181.7 |
| 4,664,709 A | 5/1987 | Castenson | 106/31.81 |
| 4,960,935 A | 10/1990 | Dietz et al. | 564/325 |
| 5,070,159 A | 12/1991 | Dietz et al. | 525/504 |
| 5,334,756 A | 8/1994 | Likibi et al. | 562/565 |
| 5,440,060 A | 8/1995 | Uhrig et al. | 554/107 |
| 6,126,736 A | 10/2000 | Stoll et al. | 106/506 |

FOREIGN PATENT DOCUMENTS

| | | |
|---|---|---|
| DE | 2 163 143 | 8/1972 |
| DE | 25 55 895 | 6/1977 |
| DE | 29 13 176 | 10/1980 |
| EP | 0 017 189 | 10/1980 |
| EP | 0 044 025 | 1/1982 |
| EP | 0 071 861 | 2/1983 |
| EP | 0 253 272 | 1/1988 |
| EP | 0 542 052 | 5/1993 |

OTHER PUBLICATIONS

English abstract for DE 2555895, Jun. 23, 1977.
English abstract for EP 0017189, Oct. 15, 1980.
English abstract for DE 2913176, Oct. 23, 1980.
English abstract for EP 0542052, May 19, 1993.

*Primary Examiner*—Michael J. Feely
(74) *Attorney, Agent, or Firm*—Anthony A. Bisulca

(57) ABSTRACT

The invention relates to addition compounds of formula (1):

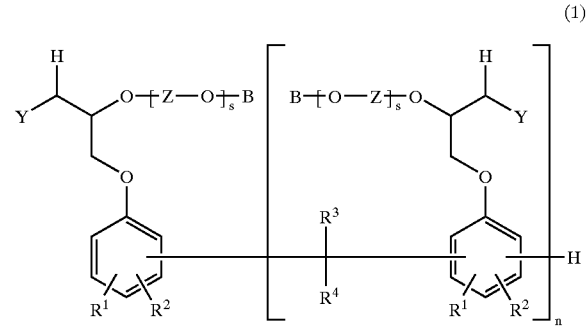

in which: n is a number from 1 to 10; $R^1$ and $R^2$ are identical or different and are each a hydrogen atom or a saturated or unsaturated aliphatic radical having 1 to 4 carbon atoms; $R^3$ and $R^4$ are identical or different and are each a hydrogen atom or alkyl having 1 to 3 carbon atoms, and the bridge member $(R^3+R^4)$ is in each case positioned ortho or meta in relation to the phenolic oxygen atom; Z represents a group —$CH_2$—$CH_2$—, —$CH_2$—$CH(CH_3)$—, —$CH(CH_3)$—$CH_2$— or a combination thereof; s is number from 1 to 200; B represents hydrogen, —CO—CH=CH—COOM, —COCH($SO_3$M)$CH_2$COOM, —CO—$CH_2$—CH($SO_3$M)—COOM, —$SO_3$M, —$SO_2$M and/or —$PO_3$MM, whereby M is preferably a cation selected from the group $Li^+$, $Na^+$, $K^+$, $NH_4^+$, HO—$CH_2$—$CH_2$—$NH_3^+$, (HO—$CH_2$—$CH_2$—$)_2NH_2^+$ or (HO—$CH_2$—$CH_2$—$)_3NH^+$; and Y is a radical of an amine. The inventive addition compounds are used as dispersing agents of solids, for example, pigments, particularly in aqueous media.

21 Claims, No Drawings

OXALKYLATION PRODUCTS PRODUCED FROM EPOXIDES AND AMINES AND THEIR USE IN PIGMENT PREPARATIONS

The present invention lies in the field of interface-active, surfactant compositions and relates to oxalkylated addition compounds obtained by reacting polyepoxides with amines. The invention further relates to the preparation of the addition compounds and to their use as dispersants for solids, particularly pigments.

In the preparation of dispersions of solids it is common to use surface active substances which are intended to reduce the mechanical effort involved in dispersing the solids into liquid media. When preparing preparations and dispersions of colorants, such as disperse dyes, or organic and inorganic pigments, for applications in aqueous or organic media a large number of nonionic, anionic, and cationic surfactants is employed for this purpose. During the incorporation of pigments and their preparations into coatings systems, printing inks, and plastics further difficulties occasionally arise, since the flocculation-stable fine division of numerous pigments in the respective application medium can be achieved only to a very inadequate extent and with a great deal of dispersing effort. The performance properties, consequently, are very often inadequate. Thus even during the dispersing operation or else only thereafter it is possible for flocculation phenomena and sedimentation to occur, leading in the colored materials to unwanted changes in the viscosity of the application medium, to changes in shade and losses of color strength, hiding power, gloss, homogeneity, and brightness, and also to poorly reproducible shades and to a high propensity to run in the case of paints.

U.S. Pat. No. 3,853,770 describes adducts of polyepoxides and secondary amines as softeners for textile materials. These products however, are incapable of providing a decisive improvement in the fluidity or flocculation stability of aqueous pigment dispersions without at the same time adversely affecting other parameters such as color strength, gloss, shade and cleanness of color, for example.

EP-A-0 071 861 describes addition compounds which are obtained by reacting diepoxides derived from bisphenol A with phenols and are subsequently also oxalkylated. The dispersing of pigments is described as a field of application of these compounds, most of which are soluble in water.

EP-A-0 044 025 and DE-A-29 13 176 describe compounds which are likewise obtainable by reacting diepoxides derived from bisphenol A and ether amines, and which are subsequently also oxalkylated. These compounds, which are likewise water-soluble, are also described as dispersants of pigments. The products described in these publications, however, are often incapable of ensuring the fluidity and the flocculation stability in pigment dispersions without adversely affecting other parameters, such as the color strength, for example.

U.S. Pat. No. 5,070,159 describes adducts prepared from polyepoxides and a mixture of aliphatic, aromatic and/or heterocyclic amines. The polyepoxides are synthesized on the basis of 2,3-epoxypropyl novolaks having 3 to 11 nuclei. The addition compounds described, however, are not oxalkylated and are described as dispersants for solids exclusively in organic media.

The present invention was based on the object of providing interface-active auxiliaries for dispersions of solids that are suitable for the preparation of highly fluid, flocculation-resistant, and storage-stable dispersions of solids, preferably dispersions of colorants, for exterior and interior coating, are substantially free from the disadvantages specified above, and are not based on bisphenol A.

It has been found that below-defined oxalkylation products prepared from epoxides and amines surprisingly achieve these objects.

The present invention provides addition compounds of the formula (1),

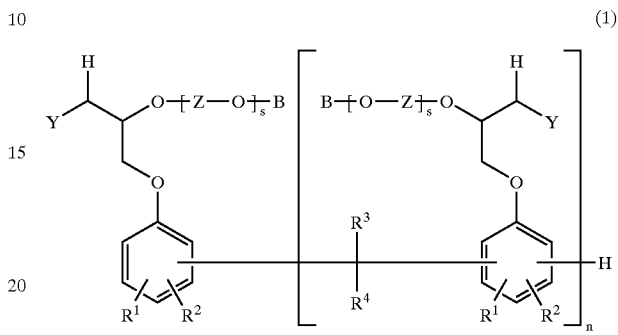

(1)

in which
n is a number from 1 to 10, for example, 1, 2, 3, 4, 5 or 6;
$R^1$, $R^2$ are identical or different and are each a hydrogen atom or a saturated or unsaturated aliphatic radical having 1 to 4 carbon atoms;
$R^3$, $R^4$ are identical or different and are each a hydrogen atom or alkyl having 1 to 3 carbon atoms, and the bridge member

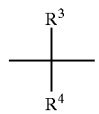

is in each case positioned ortho or meta in relation to the phenolic oxygen atom;
Z is a group —$CH_2$—$CH_2$—, —$CH_2$—$CH(CH_3)$—, —$CH(CH_3)$—$CH_2$— or a combination thereof,
s is a number between 1 and 200,
B is hydrogen, —CO—CH═CH—COOM, —COCH($SO_3$M)$CH_2$COOM, —CO—$CH_2$—$CH(SO_3$M)—COOM, —$SO_3$M,
—$SO_2$M and/or —$PO_3$MM, M being a cation, preferably from the group $Li^+$, $Na^+$, $K^+$, $NH_4^+$, HO—$CH_2$—$CH_2$—$NH_3^+$, (HO—$CH_2$—$CH_2$—)$_2$$NH_2^+$ or (HO—$CH_2$—$CH_2$—)$_3$$NH^+$ and
Y is a radical of an amine of formula (4)

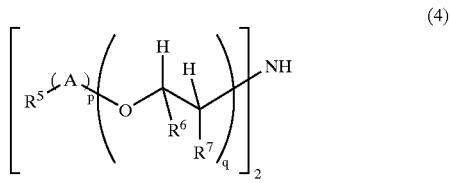

(4)

in which
$R^5$ is a saturated or singly or multiply unsaturated aliphatic radical having 6 to 30 carbon atoms, A is phenylene or naphthylene, p is zero or 1, $R^6$, $R^7$ are each hydrogen or a methyl radical, but are not simultaneously a methyl radical, and q is a number from 0 to 40;

and/or Y is a radical of an amine of the formula (S)

$$(H_2N-R^9)_{\overline{r}} N(H)_{2-r}-R^8 \quad (5)$$

in which r is a number from 0 to 2, $R^8$ is a saturated or singly or multiply unsaturated aliphatic radical having 8 to 24 carbon atoms, and $R^9$ is an alkylene group having 2 to 6 carbon atoms, and/or Y is a radical of the amines of the formulae (6), (7), (8) and/or (9)

$$N-R^{10}-R^{13} \quad (6)$$

$$N-R^{11}-NR^{12}+R^{10})_{\overline{t}} R^{13} \quad (7)$$

$$R^{14}-N-R^{15} \quad (8)$$

$$HN\overset{\frown}{\phantom{X}}R^{16} \quad (9)$$

in which t is 0 or 1, $R^{10}$ is an alkylene group having 1 to 10 carbon atoms, $R^{11}$ is an alkylene group having 2 to 6 carbon atoms, $R^{12}$ is a hydrogen atom or an alkyl group having 1 to 4 carbon atoms, $R^{13}$ is a saturated or a singly or multiply unsaturated, mononuclear or polynuclear heterocyclic or carbocyclic ring system having 3 to 18 carbon atoms which if desired also contains in the ring 1, 2 or 3 further heteroatoms from the group N, S and O, it being possible for the ring system to be substituted by one or more, e.g., 1, 2 or 3, of the radicals $R^{17}$, halogen atoms such as —F, —Cl and —Br, —$OR^{17}$, —$NR^{17}R^{18}$, —$COOR^{17}$, —$CONR^{17}R^{18}$, —$NR^{17}$—$COR^{18}$, —$NO_2$, —CN or $CF_3$, $R^{17}$ and $R^{18}$ independently of one another being hydrogen or an alkyl radical having 1 to 10 carbon atoms, in particular hydrogen or an alkyl group having 1 to 4 carbon atoms, $R^{14}$, $R^{15}$ are identical or different and are each a saturated or singly or multiply unsaturated aliphatic radical having 1 to 24 carbon atoms; and $R^{16}$ together with the nitrogen atom of the formula (9) forms a 5- to 7-membered heterocyclic ring system which if desired also contains in the ring 1, 2 or 3 further heteroatoms from the group N, S and O, it being possible for the ring system to be substituted by one or more of the radicals $R^{17}$, halogen atoms such as —F, —Cl, and —Br, —$OR^{17}$, —$NR^{17}R^{18}$, —$COOR^{17}$, —$CONR^{17}R^{18}$, —$NR^{17}$—$COR^{18}$, —$NO_2$, —CN or $CF_3$.

The invention also provides mixtures of addition compounds of the formula (1), so that the number n may also adopt fractional values, such as from 1.1 to 10, for example, preferably from 1.2 to 6.

$R^1$ and $R^2$ are preferably hydrogen or methyl.

$R^3$ and $R^4$ are preferably hydrogen or methyl.

Preferably s is a number from 5 to 100, in particular from 10 to 40.

M is preferably hydrogen, an alkali metal or ammonium ion, which can be alkyl-substituted.

$R^5$ is preferably a $C_6$–$C_{18}$-alkyl or $C_6$–$C_{18}$-alkenyl.

Preferably q is a number from 2 to 25, in particular from 4 to 12.

Preferably r is the number 1 or 2.

$R^8$ is preferably $C_{12}$–$C_{20}$-alkyl or $C_{12}$–$C_{20}$-alkenyl.

$R^9$ is preferably propylene or butylene.

Preferably t is 1.

$R^{10}$ is preferably $C_1$–$C_6$-alkylene.

$R^{11}$ is preferably ethylene or propylene.

$R^{12}$ is preferably hydrogen or methyl.

$R^{13}$ is preferably phenyl, naphthyl, pyrazolyl, triazolyl, piperidinyl, oxazolidinyl, imidazolyl, pyrrolyl, pyrrolidinyl, carbazolyl, benzothiazolyl, benzimidazolyl, dihydropyrrolyl, dihydropyrazolyl and oxazolidonyl.

$R^{14}$ and $R^{15}$ are preferably $C_1$–$C_{12}$-alkyl or $C_2$–$C_{12}$-alkenyl.

The compound of the formula (9) is preferably pyrazole, triazole, piperidine, oxazolidine, imidazole, pyrrole, pyrrolidine, carbazole, dihydropyrrole, dihydropyrazole, oxazolidone, morpholine, dihydropyridine or azepine.

The invention also provides a process for preparing the addition compounds of the formula (1) by reacting an epoxy compound of the formula (2)

in which X has the definition 2,3-epoxypropyl, with one or more amines of the formulae (4) to (9), oxalkylating the product, and subjecting the resulting oxalkylate, where appropriate, to monoesterification with maleic anhydride and, where appropriate, to sulfation.

The invention further provides the reaction product obtainable by the process described above.

Suitable epoxides of the formula (2) include commercially customary polyfunctional epoxides based on novolaks. Novolaks can be condensed by conventional processes, e.g., by condensing phenols and/or alkylphenols with alkanals in the presence of acidic catalysts.

The $$-\overset{R^3}{\underset{R^4}{\overset{|}{C}}}-$$

group is in the o- or m-position in relation to the —O—X group.

For the synthesis of the epoxides the phenolic hydroxyl groups are reacted by conventional processes, as described for example in U.S. Pat. No. 2,505,486, for example, with epichlorohydrin to give the glycidyl ether. Of particular interest are polyepoxides of the formula (2) in which $R^1$ and $R^2$ independently of one another are each a hydrogen atom, methyl, ethyl, 1-propyl, 2-propyl, 1-butyl, sec-butyl or tert-butyl. The formula (2) is to be regarded as an idealized formula and therefore also describes all commercially customary polyepoxides in which as a result of side reactions during the introduction of the epoxy group onto the phenolic hydroxyl group not all the hydroxyl groups are etherified and converted to the 2,3-epoxypropyl radical. Starting product for the process of the invention are therefore also polyepoxides in which up to 30% of all X in the formula (2) describe other radicals deriving from the synthesis e.g. 2,3-dihydroxy-prop-1-yl and/or 3-chloro-2-hydroxy-prop-1-yl radicals. The skilled worker is aware, moreover, that the preparation of novolaks by conventional processes, e.g., by condensing phenols and/or alkylphenols with alkanals in the presence of acidic catalysts, may often give rise to mixtures of different condensates. Since for reasons of cost such mixtures are generally not separated into pure species, the index n may also adopt values which deviate from the integral numbers.

One example of commercially customary polyepoxides of the formula (2) are, for example, ®ARALDITES.

The secondary ether amines of the formula (4) are obtainable for example in accordance with the process described in DE-A-2 555 895. In that process oxalkylates of the formula (10)

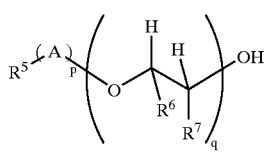

are reacted in liquid phase with ammonia and hydrogen in the presence of (de)hydrogenation catalysts, examples being nickel catalysts and cobalt catalysts.

Suitable radicals $R^5$ of the secondary ether amines of the formula (4) include in particular the alkyl radicals of fatty alcohols obtained from natural fats and oils and also of alcohols from the oxo process. Of the amines as described for the formulae (4), (5), (6), (7), (8), and (9) mention may be made of the following:

octylamine, decylamine, dodecylamine, tetradecylamine, hexadecylamine, octadecylamine, coconut fatty amine, laurylamine, oleylamine, rape seed oil fatty amine, stearylamine, tallow fatty amine, dicocoalkylpentaoxoethylamine, didecylamine, diisotridecylamine, distearylamine, ditallow fatty amine, dicoconut amine, tallow fatty propylene diamine, oleylpropylenediamine, laurylpropylenediamine, N,N-bis(aminopropyl)-tallow fatty amine, 1-(3-aminopropyl)imidazole, and furfuryl amine.

In the reaction of the amines with the polyepoxide of the formula (2) it is preferred to react from 50 to 100%, in particular from 70 to 100%, of the 2,3-epoxypropyl radicals with an amine of the formula (4) or with mixtures of two or more amines of the formula (4) and also preferably from 0 to 50%, in particular from 0 to 30%, with amines of the formula (5), (6), (7), (8) and/or (9).

The epoxide is preferably reacted in one reaction step with a corresponding amine or the amine mixture. This reaction can be conducted in the presence or absence of solvents which are inert or at least of negligible reactivity under the reaction conditions. Examples that may be mentioned include hydrocarbons, especially aromatic hydrocarbons such as toluene, for example, or ethylene glycol ethers such as ethylene glycol monomethyl ether, for example. The reaction can be conducted at temperatures from 0 to 200° C., preferably from 40 to 160° C. It is appropriate to conduct the reaction in the absence of oxygen. Particularly suitable catalysts for the epoxide ring opening include acidic catalysts such as aluminum chloride, for example, or phenols.

Subsequent oxalkylation of the amine-opened glycidyl ethers on the hydroxyl group takes place in accordance with known methods, preferably with alkali metal hydroxides or alkali metal alkoxides as catalyst at 100 to 200° C., preferably at from 140 to 180° C. The amount of ethylene oxide and/or propylene oxide is made such that the adducts can be stably emulsified or fully dissolved in water. For each hydroxy group of the 1,2-amino alcohol group it is preferred to add on from 1 to 200, preferably from 10 to 40, mol of ethylene oxide and/or propylene oxide. An alternative option is first to insert a polyoxypropylene chain using propylene oxide and then to insert a polyoxyethylene chain using ethylene oxide. The amount of alkylene oxide added on also depends on the intended end use and the associated target degree of hydrophilicity. The alkali metal hydroxide is suitably potassium hydroxide and/or sodium hydroxide, the alkali metal alkoxide sodium methoxide or ethoxide. The concentration of the catalyst ought preferably to be from 0.05 to 2% by weight, based on the amine-glycidyl ether adduct, at the beginning of the oxalkylation. The oxalkylation can be conducted without superatmospheric pressure or in pressure vessels using propylene oxide or, preferably ethylene oxide or mixtures of both, it being possible to supply the alkylene oxide in gas or liquid form. The operating pressure when carrying out the reaction in pressure vessels is from 1 to 10 bar, preferably from 2 to 6 bar. The compounds or mixtures of compounds obtained can be used either directly or in an aqueous and/or organic solution, depending on the intended end use.

Where the intended end use of the dispersant dictates that the terminal hydroxyl groups are to be reacted further, they can be converted fully or partly into the corresponding maleic monoesters with either corresponding stoichiometric or substoichiometric amounts (based on the terminal hydroxyl groups) of maleic anhydride or other reactive maleic acid derivatives. The monoesterification is accomplished by mixing and stirring, for example, maleic anhydride with the oxalkylated amine-glycidyl ether adduct at 10 to 110° C., preferably at from 40 to 80° C., optionally in the presence of alkali metal hydroxides, whose concentration should be from 0.1 to 2.0% by weight, based on the overall mixture. Since maleic anhydride has a tendency to sublime it may be advantageous from a process engineering standpoint to operate in pressure vessels under a superatmospheric pressure of about 0.2 to 1.0 bar of inert gas and also to ensure vigorous commixing.

Conversion of the maleic monoesters to the corresponding sulfosuccinic monoesters is accomplished by adding aqueous sulfite solution or hydrogensulfite solution. The amount of the solution can be made such that either all or only some of the maleic monoester groups are converted to sulfosuccinic monoester groups. For each maleic monoester group to be reacted from 1.0 to 2.0 equivalents, preferably from 1.05 to 1.15 equivalents, of alkali metal or alkaline earth metal sulfite, hydrogen sulfite or disulfite are used. Where aqueous solutions of sulfites are used in this reaction the corresponding neutral salts of the sulfosuccinic monoesters are formed. Where aqueous solutions of hydrogen sulfites are used, acidic monoester salts are formed. The amount of water added can amount to from 30 to 90% by weight, based on the overall solution or mixture. It is dependent in particular on the solubility of the sulfosuccinic monoesters and on the viscosity of the solution.

The compounds of the invention are suitable for dispersing solids, particularly in aqueous liquids. Mention may be made of dispersions comprising solids, for example, finely divided ores, minerals, sparingly soluble or insoluble salts, particulate waxes or polymers, crop protection and pest control agents, optical brighteners, UV absorbers or light stabilizers, especially dyes and organic or inorganic pigments.

The present invention further provides pigment preparations containing
 a) from 1 to 80% by weight, preferably from 5 to 60% by weight, in particular from 10 to 50% by weight, of one or more pigments;
 b) from 1 to 50% by weight, preferably from 5 to 40% by weight, in particular from 8 to 30% by weight, of at least one compound of the formula (1) or at least one of the oxalkylation products of epoxides of the formula (2) and amines of the formulae (4) to (9) prepared by the process described above;
 c) from 0 to 50% by weight, in particular from 0 to 30% by weight, of further additives; and
 d) from 10 to 80% by weight of water, based in each case on the overall weight (100% by weight) of the pigment preparation.

The pigments that may be present in the preparations of the invention are not subject to any restriction. They may be organic or inorganic in nature. Examples of organic pigments for the purposes of the invention are monoazo pigments, disazo pigments, laked azo pigments, triphenylmethane pigments, thioindigo pigments, thiazineindigo pigments, perylene pigments, perinone pigments, anthanthrone pigments, diketopyrrolopyrrole pigments, dioxazine pigments, quinacridone pigments, phthalocyanine pigments, isoindolinone pigments, isoindoline pigments, benzimidazolone pigments, naphthol pigments and quinophthalone pigments. Particular mention ought also to be made of acidic to alkaline carbon blacks from the group of the furnace blacks or gas blacks.

Examples of suitable inorganic pigments include titanium dioxide, zinc sulfides, iron oxides, chromium oxides, ultramarine, nickel or chromium antimony titanium oxides, cobalt oxides, and bismuth vanadates.

Examples of further customary additives are anionic, cationic or nonionic surfactants, additives for adjusting the rheology, pigment derivatives which act as dispersants, e.g., N-($C_{10}$–$C_{30}$)-alkyl- or N-($C_{10}$–$C_{30}$)-alkenyl-phthalimides, the urea compounds specified in EP-A-0 542 052, foam suppressants, preservatives, framework substances which can be used in emulsifying and dispersing formulations, dryout preventatives, such as glycols, for example, such as propane-1,2-diol, monoethylene glycol or diethylene glycol, higher molecular mass polyether polyols possessing a molecular weight, determined as the numerical average, of from 250 to 10000, in particular from 250 to 2000, having a boiling point under atmospheric pressure of more than 150° C. Suitable polyether polyols include homo-, co- or block-co-polyether polyols, which can be prepared by reacting ethylene oxide and/or propylene oxide with water or with low molecular mass alcohols or amines.

Suitable surfactants include all known anionic, cationic, and nonionic interface-active compounds. Surfactants which have been found to be particularly appropriate are those which possess one or more than one medium- or long-chain hydrocarbon chain. Of the multiplicity of the compounds only a selection will be listed at this point, though without restricting the applicability of the compounds of the invention to these examples. Examples are alkyl sulfates, alkyl sulfonates, alkyl phosphates, alkylbenzene sulfonates, such as lauryl sulfate, stearyl sulfate, dodecyl sulfonates, octadecyl sulfates, dodecyl sulfonates, condensation products of fatty acid and taurine or hydroxyethane sulfonic acid, alkoxylation products of alkyl phenols, castor oil rosin esters, fatty alcohols, fatty amines, fatty acids, and fatty acid amides, reaction products of nonylphenol and shorter-chain, substituted alkyl phenols and also their polymeric derivatives, e.g., formaldehyde condensation products, and also polymeric compounds such as polyacrylates, for example.

Aqueous dispersions prepared on this basis are outstandingly suitable for pigmenting both hydrophilic and hydrophobic systems and are notable for a very low drying or dryup tendency.

One feature deserving a particular emphasis is the markedly improved redispersibility of fractions of preparation that have dried or dried out.

The present invention additionally provides a process for producing the pigment preparations of the invention by adding the compound(s) of the formula (1) and, where appropriate, the further additives during the pigment synthesis or during one of the customary processing steps such as grinding, dispersing or finishing or else not until the pigment is incorporated into the application medium. The compound of the formula (1) can be added here in pure or dissolved form to the pigment, which is in the form of a solid or a dispersion in water or an organic solvent. Dispersing and grinding operations take place in accordance with the grain hardness of the pigment used in a known way, for example, in sawtooth stirrers (dissolvers), rotor-stator mills, turbulent high-speed mixers, ballmills, sandmills or beadmills, in kneading units or on roll mills.

The liquid to paste like pigment preparations produced in this way are available for any purpose for which colorant dispersions can normally be employed and for which stringent requirements are imposed on flocculation stability and/or storage stability, changes in the viscosity of the application medium, changes in shade, color strength, hiding power, gloss, homogeneity, and brilliance.

Accordingly they are suitable, for example, for coloring natural and synthetic materials. They are of particular value for the pigmentation of paints, including emulsion paints, dispersion varnishes, for printing inks, examples being textile printing, flexographic printing or gravure printing inks, for wallpaper inks, for water-thinnable coating materials, for wood preservation systems, for plasters, for wood stains, for paper pulps, for colored pencil leads, for fibertip pens, water colors, pastes for ballpoint pens, chalks, detergents, including cleaning products, shoe polishes, coloring of latex products, abrasives, and for coloring plastics and high molecular mass materials.

The pigment dispersions of the invention are also suitable for use as colorants in electrophotographic toners and developers, such as one- or two-component powder components, (also called one- or two-component developers), magnetic toners, liquid toners, polymerization toners, and further specialty toners (L. B. Schein, "Electrophotography and Development Physics"; Springer Series in Electrophysics 14, Springer Verlag, $2^{nd}$ edition, 1992). The pigment dispersions of the invention are additionally suitable for use as colorants in ink-jet inks, based on both aqueous and non-aqueous systems, and also in those inks which operate in accordance with the hot-melt process or are based on microemulsions.

The pigment dispersions of the invention can be mixed in any proportion with water and feature outstanding flocculation stability and storage stability in many aqueous emulsion paints, in comparison to conventional pigment dispersions. Where the pigment dispersions are prepared using additives which are compatible with hydrophobic paint binder systems, it is then possible to produce dispersions which are also stable to flocculation in hydrophobic media. Qualities deserving of particular emphasis are the good rheological properties and also the excellent dispersibility in different application media. The dispersants of the invention thus make it possible, alone or in combination with suitable other auxiliaries, to achieve the full color strength and brightness of the pigments in the dispersing operation and stabilize those qualities durably in the application medium. Light-colored and bright shades are unimpaired by the slight intrinsic coloring of the dispersants of the invention.

The examples which follow serve to illustrate the invention; percentages are by weight, parts denote weight fractions. Viscosities were measured at 23° C. using a cone and plate viscometer, and are based on a shear rate of D=60 sec$^{-1}$. Room temperature denotes a temperature of approximately 25° C.

PREPARATION EXAMPLE 1

A stirred vessel was charged with 457.5 parts of an amine of the formula (4) with $R^6$, $R^7$=hydrogen, $R^5$=alkyl radical of coconut fatty alcohol, p=0, and q=5, and with 0.26 part of phenol under an inert gas atmosphere. This mixture was heated to an internal temperature of 100° C. and, at this temperature, 129.6 parts of a finely powdered polyepoxide of the idealized structure in formula (2) with $R^1$=2-methyl, $R^2$, $R^3$, $R^4$=hydrogen, n=5, epoxy equivalent weight 225 [g/eq] (®Araldite ECN 1273), were added over the course of 5 minutes. The mixture was heated over the course of 45 minutes to an internal temperature of 150° C. and the reaction mixture was stirred at this temperature for 7 hours. The adduct obtained was slightly yellowish in color but clear, and had a viscosity of η=1125 mPas.

492.1 parts of the adduct were transferred to a pressure vessel and admixed with 3.0 parts of potassium hydroxide solution (40% strength by weight), with stirring. The reaction mixture was heated to 150° C. and the water of the potassium hydroxide solution was distilled off over the course of about 30 minutes with a slight vacuum. Oxethylation was then carried out with stirring and introduction of 532.0 parts of ethylene oxide at from 150 to 160° C. over the course of 70 minutes, during which a pressure of about 4 to 6 bar was maintained. After all of the ethylene oxide had been injected, stirring was continued at 120° C. internal temperature for 30 minutes more. The oxethylate obtained was present at room temperature in the form of a slightly yellowish, cloudy viscous mass with a viscosity of η=27375 mPas.

PREPARATION EXAMPLE 2

A stirred vessel was charged with 205.9 parts of an amine of the formula (4) with $R^6$, $R^7$=hydrogen, $R^5$=alkyl radical of coconut fatty alcohol, p=0, and q=5, 7.7 parts of oleylamine with a composition of 1% $C_{12}$, 3% $C_{14}$, 18% $C_{16}$, 76% $C_{18}$, 1% $C_{20}$, and an iodine number of from 75 to 85, and with 0.13 part of phenol under an inert gas atmosphere. This mixture was heated to an internal temperature of 100° C. and, at this temperature, 64.8 parts of a finely powdered polyepoxide of the idealized structure in formula (2) with $R^1$=2-methyl, $R^2$, $R^3$, $R^4$=hydrogen, n=5, epoxy equivalent weight 225 [g/eq], were added over the course of 5 minutes. The mixture was heated to an internal temperature of 120° C., held at this temperature for 4 hours, then heated to 150° C., and the reaction mixture was stirred at this temperature for a further 2 hours. The adduct obtained was slightly yellowish in color but clear, and had a viscosity of η=5328 mPas.

224.8 parts of the adduct were transferred to a pressure vessel and admixed with 1.5 parts of potassium hydroxide solution (40% strength by weight), with stirring. The reaction mixture was heated to 150° C. and the water of the potassium hydroxide solution was distilled off over the course of about 30 minutes with a slight vacuum. Oxethylation was then carried out with stirring and introduction of 295.0 parts of ethylene oxide at from 150 to 160° C. over the course of 40 minutes, during which a pressure of about 4 to 5.5 bar was maintained. After all of the ethylene oxide had been injected, stirring was continued at 120° C. internal temperature for 30 minutes more. The oxethylate obtained was present at room temperature in the form of a slightly yellowish, cloudy viscous mass with a viscosity of η=53960 mPas.

PREPARATION EXAMPLE 3

A stirred vessel was charged with 210.5 parts of an amine of the formula (4) with $R^6$, $R^7$=hydrogen, $R^5$=alkyl radical of coconut fatty alcohol, p=0, and q= 5, 14.7 parts of di-tallow fatty amine with a composition of 3% $C_{14}$, 29% $C_{16}$, 63% $C_{18}$, ≦3% $C_{20}$, and an iodine number of from 45 to 55, and with 0.13 part of phenol under an inert gas atmosphere. This mixture was heated to an internal temperature of 100° C. and, at this temperature, 66.2 parts of a finely powdered polyepoxide of the idealized structure in formula (2) with $R^1$=2-methyl, $R^2$, $R^3$, $R^4$=hydrogen, n=5, epoxy equivalent weight 225 [g/eq], were added over the course of 5 minutes. The mixture was heated over 45 minutes to an internal temperature of 150° C. and the reaction mixture was stirred at this temperature for 7 hours. The adduct obtained was slightly yellowish in color but clear, and had a viscosity of η=2800 mPas.

248.7 parts of the adduct were transferred to a pressure vessel and admixed with 1.5 parts of potassium hydroxide solution (40% strength by weight), with stirring. The reaction mixture was heated to 150° C. and the water of the potassium hydroxide solution was distilled off over the course of about 30 minutes with a slight vacuum. Oxethylation was then carried out with stirring and introduction of 315.0 parts of ethylene oxide at from 150 to 160° C. over the course of 40 minutes, during which a pressure of about 4 to 5.5 bar was maintained. After all of the ethylene oxide had been injected, stirring was continued at 120° C. internal temperature for 30 minutes more. The oxethylate obtained was present at room temperature in the form of a slightly yellowish, cloudy viscous mass with a viscosity of η=32170 mPas.

PREPARATION EXAMPLE 4

A stirred vessel was charged with 160.1 parts of an amine of the formula (4) with $R^6$, $R^7$=hydrogen, $R^5$=alkyl radical of coconut fatty alcohol, p=0, and q=5, 43.2 parts of di-tallow fatty amine with a composition of 3% $C_{14}$, 29% $C_{16}$, 63% $C_{18}$, ≦3% $C_{20}$, and an iodine number of from 45 to 55, and with 0.3 part of phenol under an inert gas atmosphere. This mixture was heated to an internal temperature of 100° C. and, at this temperature, 64.8 parts of a finely powdered polyepoxide of the idealized structure in formula (2) with $R^1$=2-methyl, $R^2$, $R^3$, $R^4$=hydrogen, n=5, epoxy equivalent weight 225 [g/eq], were added over the course of 5 minutes. The mixture was heated for over 45 minutes to an internal temperature of 150° C. and the reaction mixture was stirred at this temperature for 7 hours. The adduct obtained was slightly yellowish in color but clear, and had a viscosity of η=3742 mPas.

209.9 parts of the adduct were transferred to a pressure vessel and admixed with 1.0 part of potassium hydroxide solution (40% strength by weight), with stirring. The reaction mixture was heated to 150° C. and the water of the potassium hydroxide solution was distilled off over the course of about 30 minutes with a slight vacuum. Oxethylation was then carried out with stirring and introduction of 285.0 parts of ethylene oxide at from 150 to 160° C. over the course of 40 minutes, during which a pressure of about 4 to 5.5 bar was maintained. After all of the ethylene oxide had been injected, stirring was continued at 120° C. internal temperature for 30 minutes more. The oxethylate obtained was present at room temperature in the form of a slightly yellowish, cloudy viscous mass with a viscosity of η=46610 mPas.

PREPARATION EXAMPLE 5

A stirred vessel was charged with 288.0 parts of di-tallow fatty amine with a composition of 3% $C_{14}$, 29% $C_{16}$, 63% $C_{18}$, ≦3% $C_{20}$, iodine number 45 to 55 and with 0.26 part of phenol under an inert gas atmosphere. This mixture was heated to an internal temperature of 100° C. and, at this temperature, 129.6 parts of a finely powdered polyepoxide of the idealized structure in formula (2) with $R^1$=2-methyl, $R^2$, $R^3$, $R^4$=hydrogen, n=5, epoxy equivalent weight 225 [g/eq], were added over the course of 5 minutes. The mixture was heated over the course of 45 minutes to an internal temperature of 150° C. and the reaction mixture was stirred at this temperature for 7 hours. The resulting adduct obtained was a clear viscous mass which was slightly brownish yellow in color.

388.9 parts of the adduct were transferred to a pressure vessel and admixed with 3.0 parts of potassium hydroxide solution (40% strength by weight), with stirring. The reaction mixture is heated to 150° C. and the water of the potassium hydroxide solution was distilled off over the course of about 30 minutes with a slight vacuum. Oxethylation was then carried out with stirring and introduction of 937.0 parts of ethylene oxide at from 150 to 160° C. over the course of 95 minutes, during which a pressure of about 4 to 5.5 bar was maintained. After all of the ethylene oxide had been injected, stirring was continued at 120° C. internal temperature for 30 minutes more. The oxethylate obtained was present at room temperature in the form of a slightly yellowish-pale brown, cloudy waxlike mass.

PREPARATION EXAMPLE 6

A stirred vessel was charged with 290.9 parts of distearylamine with a composition of 3% $C_{14}$, 29% $C_{16}$, 63% $C_{18}$, ≦3% $C_{20}$, iodine number ≦5 and with 0.26 part of phenol under an inert gas atmosphere. This mixture was heated to an internal temperature of 100° C. and, at this temperature, 129.6 parts of a finely powdered polyepoxide of the idealized structure in formula (2) with $R^1$=2-methyl, $R^2$, $R^3$, $R^4$=hydrogen, n=5, epoxy equivalent weight 225 [g/eq], were added over the course of 5 minutes. The mixture was heated over the course of 45 minutes to an internal temperature of 150° C. and the reaction mixture was stirred at this temperature for 7 hours. The resulting adduct obtained was a clear viscous mass which was slightly yellowish in color.

396.8 parts of the adduct were transferred to a pressure vessel and admixed with 3.0 parts of potassium hydroxide solution (40% strength by weight), with stirring. The reaction mixture was heated to 150° C. and the water of the potassium hydroxide solution was distilled off over the course of about 30 minutes with a slight vacuum. Oxethylation was then carried out with stirring and introduction of 950.0 parts of ethylene oxide at from 150 to 160° C. over the course of 120 minutes, during which a pressure of about 4 to 5.5 bar was maintained. After all of the ethylene oxide had been injected, stirring was continued at 120° C. internal temperature for 40 minutes more. The oxethylate obtained was present at room temperature in the form of a slightly yellowish-pale brown, cloudy waxlike mass.

PREPARATION EXAMPLE 7

A stirred vessel was charged with 205.9 parts of an amine of the formula (4) with $R^6$, $R^7$=hydrogen, $R^5$=alkyl radical of coconut fatty alcohol, p=0, and q=5, 1.9 parts of pyrrole and with 0.13 part of phenol under an inert gas atmosphere. This mixture was heated to an internal temperature of 100° C. and, at this temperature, 64.8 parts of a finely powdered polyepoxide of the idealized structure in formula (2) with $R^1$=2-methyl, $R^2$, $R^3$, $R^4$=hydrogen, n=5, epoxy equivalent weight 225 [g/eq], were added over the course of 5 minutes. The mixture was heated over 45 minutes to an internal temperature of 150° C. and the reaction mixture was stirred at this temperature for 7 hours.

216.5 parts of the adduct were transferred to a pressure vessel and admixed with 1.0 part of potassium hydroxide solution (40% strength by weight), with stirring. The reaction mixture was heated to 150° C. and the water of the potassium hydroxide solution was distilled off over the course of about 30 minutes with a slight vacuum. Oxethylation was then carried out with stirring and introduction of 285.0 parts of ethylene oxide at from 150 to 160° C. over the course of 95 minutes, during which a pressure of about 4 to 5.5 bar was maintained. After all of the ethylene oxide had been injected, stirring was continued at 120° C. internal temperature for 30 minutes more. The oxethylate obtained was present at room temperature in the form of a slightly yellowish brown, cloudy waxlike mass.

PREPARATION EXAMPLE 8

A stirred vessel was charged with 205.9 parts of an amine of the formula (4) with $R^6$, $R^7$=hydrogen, $R^5$=alkyl radical of coconut fatty alcohol, p=0, and q=5, and with 0.13 part of phenol under an inert gas atmosphere. This mixture was heated to an internal temperature of 100° C. and, at this temperature, 64.8 parts of a finely powdered polyepoxide of the idealized structure in formula (2) with $R^1$=2-methyl, $R^2$, $R^3$, $R^4$=hydrogen, n=5, epoxy equivalent weight 225 [g/eq], were added over the course of 5 minutes. The mixture was heated over 45 minutes to an internal temperature of 150° C. and the reaction mixture was stirred at this temperature for 5 hours. Thereafter, still at this temperature, 3.6 parts of 1,3-aminopropylamidazole are added in one portion and the reaction mixture is stirred at this temperature for 2 hours more. The adduct obtained was red-brownish in color but clear, and had a viscosity of η=11230 mPas.

218.8 parts of the adduct were transferred to a pressure vessel and admixed with 1.0 part of potassium hydroxide solution (40% strength by weight), with stirring. The reaction mixture was heated to 150° C. and the water of the potassium hydroxide solution was distilled off over the course of about 30 minutes with a slight vacuum. Oxethylation was then carried out with stirring and introduction of 285.0 parts of ethylene oxide at from 150 to 160° C. over the course of 40 minutes, during which a pressure of about 4 to 5.5 bar was maintained. After all of the ethylene oxide had been injected, stirring was continued at 120° C. internal temperature for 30 minutes more. The resulting oxethylate obtained took the form at room temperature of a deep brown, cloudy viscous mass with a viscosity of viscosity of η=35930 mPas.

PREPARATION EXAMPLE 9

A stirred vessel was charged with 116.0 parts of a polyepoxide of the idealized structure in formula (2) with $R^1$, $R^2$, $R^3$, $R^4$=hydrogen, n=1.2, epoxy equivalent weight 175 [g/eq] (®Araldite EPN 1179) and 0.26 part of phenol under an inert gas atmosphere. This mixture was heated to an internal temperature of 100° C. and at this temperature 524.2 parts of an amine of the formula (4) with $R^6$, $R^7$=hydrogen, $R^5$=alkyl radical of coconut fatty alcohol, p=0, and q=5 were added over the course of 15 minutes. Over the course of 45 minutes the mixture was heated to an internal temperature of 160° C. and the reaction mixture was stirred at this temperature for 8 hours. The resulting adduct was slightly yellowish in color but clear, and had a viscosity of η=456 mPas.

493.5 parts of the adduct were transferred to a pressure vessel and 3.0 parts of the potassium hydroxide solution (40% strength by weight) were added with stirring. The reaction mixture was heated to 150° C. and the water of the potassium hydroxide solution was distilled off over the course of about 30 minutes with a gentle vacuum. Then oxethylation was carried out with stirring and introduction of 560.3 parts of ethylene oxide at 150 to 160° C. over the course of 60 minutes, during which a pressure of about 4 to 6 bar was maintained. After all of the ethylene oxide had been injected, stirring was continued at an internal temperature of 120° C. for 30 minutes more. The oxethylate obtained took the form at room temperature of a pale yellowish, cloudy, viscous mass.

PREPARATION EXAMPLE 10

A stirred vessel was charged with 491.6 parts of tallow fatty amine with a composition of 3% $C_{14}$, 29% $C_{16}$, 63% $C_{18}$, <3% $C_{20}$, iodine number from 40 to 50, amine number 208 to 220 under an inert gas atmosphere and this initial charge was heated to an internal temperature of 140° C. At this temperature 328.5 parts of a polyepoxide of the idealized structure in formula (2) with $R^1$, $R^2$, $R^3$, $R^4$=hydrogen, n=1.5, epoxy equivalent weight 175 [g/eq] (®Araldite PY 307-1) are added continuously over the course of 6 hours. Thereafter the batch was stirred at this temperature for 2 hours more. The adduct obtained was a pale waxlike mass at room temperature.

224.8 parts of the adduct were transferred to a pressure vessel and 3.0 parts of potassium hydroxide solution (40% strength by weight) were added with stirring. The reaction mixture was heated to 150° C. and the water of the potassium hydroxide solution was distilled off over the course of about 30 minutes with a gentle vacuum. Then oxethylation was carried out with stirring and introduction of 905.0 parts of ethylene oxide at 150 to 160° C. over the course of 95 minutes, during which a pressure of about 4 to 5.5 bar was maintained. After all of the ethylene oxide had been injected, stirring was continued at an internal temperature of 120° C. for 30 minutes more. The oxethylate obtained took the form at room temperature of a pale yellowish-light brown, solid, waxlike mass.

Preparation of Adduct Oxalkylate Sulfosuccinates

PREPARATION EXAMPLE 11

In a stirred vessel, 375.0 parts of oxethylate from Preparation Example 1 were mixed with 17.35 parts of maleic anhydride at room temperature under an inert gas atmosphere and slight superatmospheric pressure, in order to prevent sublimation of the maleic anhydride. The reaction mixture was then heated first at an internal temperature of 70° C. for 1 hour, then stirred at an internal temperature of 85 to 90° C. for a further 2 hours. During this time the viscosity of the reaction mixture rose markedly and took on a gelatinous consistency. Subsequently a solution of 22.30 parts of sodium sulfite in 1658.0 parts of demineralized water was run in over the course of 1 hour at an internal temperature of 70° C., followed by stirring at this temperature for 3 hours until the batch had become soluble in water to give a clear solution. The pH of the solution was then adjusted to 7.0 using NaOH solution (50% strength). At room temperature the product takes the form of a clear solution, slightly yellowish in color, with a viscosity of η=175 mPas and has a solids concentration of 20% by weight.

PREPARATION EXAMPLE 12

In a stirred vessel, 100.0 parts of oxethylate from Preparation Example 5 were mixed with 4.7 parts of maleic anhydride at room temperature under an inert gas atmosphere and slight superatmospheric pressure, in order to prevent sublimation of the maleic anhydride. The reaction mixture was then heated at an internal temperature of 75° C. for 4 hours. During this time the viscosity of the reaction mixture rose markedly. Subsequently a solution of 6.05 parts of sodium sulfite and 443.0 parts of demineralized water was run in over the course of 5 minutes at an internal temperature of 70° C., followed by stirring at this temperature for 2 hours until the batch became soluble in water to give a clear solution. The pH of the solution was then adjusted to 7.0 using NaOH solution (50% strength). At room temperature the product takes the form of a clear solution, slightly yellowish in color, with a viscosity of η=53 mPas and has a solids concentration of 20% by weight.

USE EXAMPLES

General Remarks

To produce the pigment preparations first of all the constituents, without the respective pigment, were homogenized in the empty grinding part of a laboratory bead mill in accordance with the formulations set out in the examples below. Using a sawtooth disk the pulverulent pigment was then incorporated and the amount of water chosen was such as to give a homogeneous, readily stirrable dough. Thereafter, grinding media were added and grinding was commenced. After the first mixing of the grinding medium at the beginning of the grinding operation the optimum grinding viscosity was set accordingly by adding water. After the grinding operation the grinding media were separated off, for example, by filtration and/or centrifugation.

For suitability testing the pigment preparations were stirred at a concentration of to 1 to 5% into different, commercially available standard white emulsion paints, applied as a thin film and then evaluated coloristically (white reduction).

It is also possible to incorporate the pigment preparation into a test varnish in order to assess the varnish compatibility.

As well as the incorporation of the pigment preparation into the white emulsion paint or test varnish, by stirring with a spatula, an analogous sample was prepared by stirring it in using a dissolver disk. Both samples were compared with one another for color strength. In this evaluation, values close to 100% indicate excellent dispersing and a high level of compatibility of the pigment preparation with emulsion paints and varnish.

To test the dispersibility and flocculation stability in the application medium, a portion of the film, following brief initial drying, was rubbed repeatedly with a brush or with a finger under moderate pressure. If the pigment preparation cannot be satisfactorily dispersed in the test medium or if flocculation occurs when the preparation is introduced into the test medium, then flocculated and/agglomerated pigment particles are at least partly deflocculated and deagglomerated by the shearing force exerted on the film by rubbing. In that case the area thus treated has either a higher color strength and/or an irregular or unequal shade as compared with the unrubbed area. This test method, referred to as the rubout test, is suitable as a simple but usually very sensitive method of assessing the quality of the pigment preparation in terms of dispersibility and flocculation stability. A test of this kind is widely described in the literature, e.g., in FARBE & LACKE 100, Volume 6/2000, 51–61.

To test the storage stability, a sample of the pigment preparation is stored hot at 50–60° C. in a closed vessel for 4 to 5 weeks. The viscosity and coloristic data of the samples are measured both before and after this storage. If the preparation remains fluid or if there is little change in the rheology and coloristics, this is likewise an indication of the higher quality of dispersing which can be achieved with the dispersing auxiliaries of the invention.

USE EXAMPLE 1

29 parts of C.I. Pigment Violet 23, 12 parts of dispersing auxiliary from Preparation Example 1, 20 parts of glycol, 0.2 part of preservative and 38.8 parts of demineralized water are ground at 35 to 38° C. using a DCP Super Flow bead mill (from Drais) with 110 parts of zirconium oxide beads (d=0.6 to 0.9 mm) in 2 passes (in each case a residence time of 9 minutes in the grinding zone). The pigment preparation has a high color strength with a very clean shade, and is found to be highly fluid ($\eta$=499 mPas) and storage-stable, i.e., the sample remains fluid despite hot storage at 50° C. for 5 weeks ($\eta$=1159 mPas). The manual-stirrer dispersing of 100% in the white reduction (1% concentration) is evidence of the excellent dispersing and high emulsion paint compatibility of the pigment preparation. The pigment preparation possesses excellent stability to dryout. In the white reductions (1% concentration) there are also no rubout effects at all, i.e., the rubbed area of the colorations is identical in color strength with no irregularities in shade.

USE EXAMPLE 2

Using in Use Example 1 the dispersing auxiliary from Preparation Example 2 gives a pigment preparation again having good rheological properties (viscosity prior to hot storage $\eta$=507 mPas, good fluidity after hot storage for 5 weeks) and having comparable coloristic properties in the white reductions (1% concentration).

USE EXAMPLE 3

Using in Use Example 1 the dispersing auxiliary from Preparation Example 3 gives a pigment preparation again having good rheological properties (viscosity prior to hot storage $\eta$=441 mPas, good fluidity after hot storage for 5 weeks at 50° C.) and having comparable coloristic properties in the white reductions (1% concentration).

USE EXAMPLE 4

Using in Use Example 1 the dispersing auxiliary from Preparation Example 4 gives a pigment preparation again having good rheological properties (viscosity prior to hot storage $\eta$=384 mPas, good fluidity after hot storage for 5 weeks at 50° C.) and having comparable coloristic properties in the white reductions (1% concentration).

USE EXAMPLE 5

Using in Use Example 1 the dispersing auxiliary from Preparation Example 5 gives a pigment preparation with somewhat higher viscosity (viscosity prior to hot storage $\eta$=2448 mPas) and very good coloristic properties in the white reductions (1% concentration).

USE EXAMPLE 6

Using in Use Example 1 the dispersing auxiliary from Preparation Example 6 gives a pigment preparation having good rheological properties (viscosity prior to hot storage $\eta$=1448 mPas, adequate fluidity after hot storage for 5 weeks at 50° C.) and having comparable coloristic properties in the white reductions (1% concentration).

USE EXAMPLE 7

Using in Use Example 1 the dispersing auxiliary from Preparation Example 7 gives a pigment preparation having similarly good rheological properties (viscosity prior to hot storage $\eta$=1057 mPas, adequate fluidity after hot storage for 5 weeks at 50° C.) and having comparable coloristic properties in the white reductions (1% concentration).

USE EXAMPLE 8

Using in Use Example 1 the dispersing auxiliary from Preparation Example 8 gives a pigment preparation again with good rheological properties (viscosity prior to hot storage $\eta$=879 mPas, good fluidity after hot storage for 5 weeks at 50° C.) and having comparable coloristic properties in the white reductions (1% concentration).

USE EXAMPLE 9

40 parts of C.I. Pigment Red 146, 14 parts of dispersing auxiliary from Preparation Example 1, 5 parts of urea, 13 parts of glycol, 0.2 part of preservative and 27.8 parts of demineralized water were ground at 35 to 40° C. using a laboratory bead mill (from Drais) with 275 parts of glass beads (d=1 mm) for 60 minutes. The pigment preparation had a high color strength with a very clean shade, and is found to be highly fluid ($\eta$=268 mPas) and storage-stable, i.e., the sample remained relatively fluid despite hot storage at 50° C. for 5 weeks ($\eta$=1964 mPas). The manual-stirrer dispersing of 101% in the white reduction (1% concentration) is evidence of the excellent dispersing and high emulsion paint compatibility of the pigment preparation. The pigment preparation possesses excellent stability to dryout. In the white reductions (1% concentration) there are also no rubout effects at all, i.e., the rubbed area of the colorations is identical in color strength with no irregularities in shade.

USE EXAMPLE 10

70 parts of C.I. Pigment Green 50, 13 parts of dispersing auxiliary from Preparation Example 1, 0.4 part of oleylamine, 14 parts of glycol, 0.2 part of preservative and 2.4 parts of demineralized water were ground at 35 to 40° C. using a laboratory bead mill (from Drais) with 275 parts of glass beads (d=1 mm) for 60 minutes. The pigment preparation had a high color strength with a very clean shade, and is found to be highly fluid ($\eta$=2643 mPas) for an inorganic pigment preparation and storage-stable, i.e., the sample remained relatively fluid despite hot storage at 50° C. for 5 weeks ($\eta$=3412 mPas). The manual-stirrer dispersing of 100% in the white reduction (5% concentration) is evidence of the excellent dispersing and high emulsion paint compatibility of the pigment preparation. The pigment preparation possesses excellent stability to dryout. In the white reductions (5% concentration) there are also no rubout effects at all, i.e., the rubbed area of the colorations is identical in color strength with no irregularities in shade.

USE EXAMPLE 11

42 parts of C.I. Pigment Black 7, 6.0 parts of dispersing auxiliary from Preparation Example 1, 20 parts of glycol, 0.2 part of preservative and 31.8 parts of demineralized water were ground at 35 to 40° C. using a laboratory bead mill (from Drais) with 275 parts of glass beads (d=1 mm) for 40 minutes. The pigment preparation had a high color strength with a very clean shade, and is found to be highly fluid ($\eta$=582 mPas) for a carbon black preparation and storage-stable, i.e., the sample remained relatively fluid despite hot storage at 50° C. for 5 weeks ($\eta$=1063 mPas). The manual-stirrer dispersing of 100% in the white reduction (1% concentration) is evidence of the excellent dispersing and high emulsion paint compatibility of the pigment preparation. The pigment preparation possesses excellent stability to dryout. In the white reductions (1% concentration) there are also no rubout effects at all, i.e., the rubbed area of the colorations is identical in color strength with no irregularities in shade.

USE EXAMPLE 12

42 parts of C.I. Pigment Black 7, 6.5 parts of dispersing auxiliary from Preparation Example 9, 20 parts of glycol, 0.2 part of preservative and 31.3 parts of demineralized water were ground at 35 to 40° C. using a laboratory bead mill (from Drais) with 275 parts of glass beads (d=1 mm) for 20 minutes. The pigment preparation had a high color strength with a very clean shade, and is found to be highly fluid ($\eta$=350 mPas) for a carbon black preparation and storage-stable, i.e., the sample remained relatively fluid despite hot storage at 50° C. for 5 weeks ($\eta$=440 mPas). The manual-stirrer dispersing of 100% in the white reduction (1% concentration) is evidence of the excellent dispersing and high emulsion paint compatibility of the pigment preparation. The pigment preparation possesses excellent stability to dryout. In the white reductions (1% concentration) there are also no rubout effects at all, i.e., the rubbed area of the colorations is identical in color strength with no irregularities in shade.

USE EXAMPLE 13

35 parts of C.I. Pigment Yellow 83, 8 parts of dispersing auxiliary from Preparation Example 10, 15 parts of glycol, 0.2 part of preservative and 41.8 parts of demineralized water are ground at 35 to 38° C. using a DCP Super Flow bead mill (from Drais) with 110 parts of zirconium oxide beads (d=0.6 to 0.9 mm) in 2 passes (in each case a residence time of 9 minutes in the grinding zone). The pigment preparation has a high color strength with a very clean shade, and is found to be highly fluid ($\eta$=91 mPas) and storage-stable, i.e., the sample remains highly fluid despite hot storage at 50° C. for 5 weeks ($\eta$=78 mPas). The manual-stirrer dispersing of 100% in the white reaction (1% concentration) is evidence of the excellent dispersing and high emulsion paint compatibility of the pigment preparation. The pigment preparation possesses excellent stability to dryout. In the white reductions (1% concentration) there are also no rubout effects at all, i.e., the rubbed area of the colorations is identical in color strength with no irregularities in shade.

The pigment preparation was outstandingly suitable for producing printing inks for inkjet printing. On a variety of papers prints with outstanding color brightness were produced.

USE EXAMPLE 14

40 parts of C.I. Pigment Yellow 97, 14 parts of dispersing auxiliary from Preparation Example 1, 15 parts of glycol, 0.2 part of preservative and 30.8 parts of demineralized water were ground at 35 to 40° C. using a laboratory bead mill (from Drais) with 275 parts of glass beads (d=1 mm) for 60 minutes. The pigment preparation had a high color strength with a very clean shade, and is found to be outstandingly fluid ($\eta$=510 mPas) and storage-stable, i.e., the sample remained relatively fluid despite hot storage at 50° C. for 5 weeks ($\eta$=549 mPas). The manual-stirrer dispersing of 100% in the white reduction (1% concentration) is evidence of the excellent dispersing and high emulsion paint compatibility of the pigment preparation. The pigment preparation possessed excellent stability to dryout. In the white reductions (1% concentration) there were also no rubout effects at all, i.e., the rubbed area of the colorations was identical in color strength with no irregularities in shade.

USE EXAMPLE 15

33 parts of C.I. Pigment Yellow 154, 7.5 parts of dispersing auxiliary from Preparation Example 1, 17 parts of glycol, 0.2 part of preservative and 42.3 parts of demineralized water were ground at 35 to 40° C. using a laboratory bead mill (from Drais) with 275 parts of glass beads (d=1 mm) for 60 minutes. The pigment preparation had a high color strength with a very clean shade, and is found to be highly fluid ($\eta$=686 mPas) and storage-stable, i.e., the sample remained relatively fluid despite hot storage at 50° C. for 5 weeks ($\eta$=1 257 mPas). The manual-stirrer dispersing of 101% in the white reduction (1% concentration) is evidence of the excellent dispersing and high emulsion paint compatibility of the pigment preparation. The pigment preparation possessed excellent stability to dryout. In the white reductions (1% concentration) there were also no rubout effects at all, i.e., the rubbed area of the colorations was identical in color strength with no irregularities in shade.

USE EXAMPLE 16

48 parts of C.I. Pigment Red 112, 32.25 parts of dispersing auxiliary from Preparation Example 11, 9.5 parts of glycol, 0.2 part of preservative and 10.05 parts of demineralized water were ground at 35° C. using a laboratory bead mill (from Drais) with 275 parts of glass beads (d=1 mm) for 80 minutes. The pigment preparation had a high color strength with a very clean shade and is found to be highly stable on storage, i.e., the sample remained fluid despite hot storage at 50° C. for four weeks. The pigment preparation was notable for a very low drying and dryup tendency. In the white reductions (1% concentration), moreover, there were no rubout effects at all, i.e., the rubbed area of the colorations was identical in color strength, with no irregularities in shade. Owing to the anionic nature of the pigment preparation it is outstandingly suitable for coloring paper pulp using polycationic flocculation reagents, an application in which high color strength and bright colorations are achievable.

USE EXAMPLE 17

Using in Use Example 16 the dispersing auxiliary from Preparation Example 12 gives a pigment preparation having similarly good properties.

USE EXAMPLE 18

40 parts of C.I. Pigment Yellow 74, 7.0 parts of dispersing auxiliary from Preparation Example 1, 0.6 part of preservative and 52.4 parts of demineralized water were ground at 35° C. using a laboratory bead mill (from Drais) with 275 parts of glass beads (d=1 mm) for 60 minutes. The pigment preparation had a high color strength with a very clean shade, and is found to be outstandingly fluid ($\eta$=64 mPas) and storage-stable, i.e., the sample remained fluid despite hot storage at 50° C. for 5 weeks ($\eta$=673 mPas). The manual-stirrer dispersing of 100% in the white reduction (1% concentration) is evidence of the excellent dispersing and high emulsion paint compatibility of the pigment preparation.

The pigment preparation was notable for a very low drying and dryup tendency. In the white reductions (1% concentration) there are also no rubout effects at all, i.e., the rubbed area of the colorations was identical in color strength with no irregularities in shade.

USE EXAMPLE 19

30 parts of C.I. Pigment Yellow 154; 9.0 parts of dispersing auxiliary from Preparation Example 1, 7.5 parts of polyethylene glycol (molecular weight 500), 0.6 part of preservative and 52.9 parts of demineralized water were ground at 35° C. to 40° C. using a laboratory bead mill (from Drais) with 275 parts of glass beads (d=1 mm) for 60 minutes. The pigment preparation had a high color strength with a very clean shade, and is found to be outstandingly fluid ($\eta$=246 mPas) and storage-stable, i.e., the sample remained fluid despite hot storage at 50° C. for 5 weeks ($\eta$=855 mPas). The manual-stirrer dispersing of 100% in the white reduction (1% concentration) is evidence of the excellent dispersing and high emulsion paint compatibility of the pigment preparation. The pigment preparation was notable in particular for a very low drying and dryup tendency. In the white reductions (1% concentration) there are also no rubout effects at all, i.e., the rubbed area of the colorations was identical in color strength with no irregularities in shade.

What is claimed is:

1. An addition compound of the formula (1)

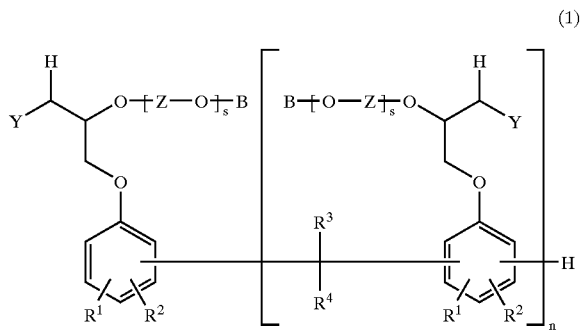

in which n is a number from 1 to 10;

$R^1$, $R^2$ are identical or different and are each a hydrogen atom or a saturated or unsaturated aliphatic radical having 1 to 4 carbon atoms;

$R^3$, $R^4$ are identical or different and are each a hydrogen atom or alkyl having 1 to 3 carbon atoms, and the bridge member

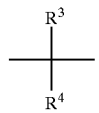

is in each case positioned ortho or meta in relation to the phenolic oxygen atom;

Z is a group —CH$_2$—CH$_2$—, —CH$_2$—CH(CH$_3$)—, —CH(CH$_3$)—CH$_2$— or a combination thereof, s is a number between 1 and 200, B is hydrogen, —CO—CH=CH—COOM, —COCH(SO$_3$M)CH$_2$COOM, —CO—CH$_2$—CH (SO$_3$M)—COOM, —SO$_3$M, —SO$_2$M or —PO$_3$MM, M being a cation; and Y is a radical of an amine of formula (4)

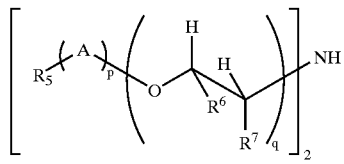

in which
R⁵ is a saturated or singly or multiply unsaturated aliphatic radical having 6 to 30 carbon atoms,
A is phenylene or naphthylene,
p is zero or 1,
R⁶, R⁷ are each hydrogen or a methyl radical, but are not simultaneously a methyl radical, and
q is a number from 0 to 40;
and/or Y is a radical of an amine of the formula (5)

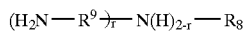

in which
r is a number from 0 to 2,
R⁸ is a saturated or singly or multiply unsaturated aliphatic radical having 8 to 24 carbon atoms, and
R⁹ is an alkylene group having 2 to 6 carbon atoms,
and/or Y is a radical of the amines of the formulae (6), (7), (8) and/or (9)

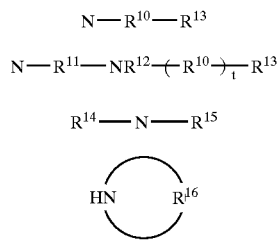

in which
t is 0 or 1,
R¹⁰ is an alkylene group having 1 to 10 carbon atoms,
R¹¹ is an alkylene group having from 2 to 6 carbon atoms,
R¹² is a hydrogen atom or an alkyl group having 1 to 4 carbon atoms,
R¹³ is a saturated or a singly or multiply unsaturated, mononuclear or polynuclear heterocyclic or carbocyclic ring system having 3 to 18 carbon atoms,
R¹⁴, R¹⁵ are identical or different and are each a saturated or singly or multiply unsaturated aliphatic radical having 1 to 24 carbon atoms; and
R¹⁶ together with the nitrogen atom of the formula (9) forms a 5- to 7-membered heterocyclic ring system.

2. An addition compound as claimed in claim 1, wherein n is a number from 1.2 to 6.

3. An addition compound as claimed in claim 1, wherein s is a number from 5 to 100.

4. An addition compound as claimed in claim 1, wherein R⁵ is C₆–C₁₈-alkyl or C₆–C₁₈-alkenyl.

5. An addition compound as claimed in claim 1, wherein R⁹ is propylene or butylene.

6. An addition compound as claimed in claim 1, wherein R¹¹ is ethylene or propylene.

7. An addition compound as claimed in claim 1, wherein the compound of the formula (9) is pyrazole, triazole, piperidine, oxazolidine, imidazole, pyrrole, pyrrolidine, carbazole, dihydropyrrole, dihydropyrazole, oxazolidone, morpholine, dihydropyridine or azepine.

8. A process for preparing an addition compound as claimed in claim 1, comprising the steps of reacting an epoxy compound of the formula (2)

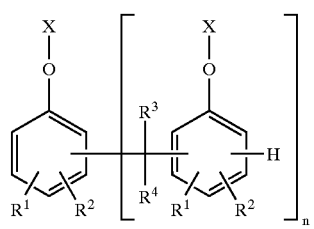

in which X has the definition 2,3-epoxypropyl, with one or more amines of the formulae (4) to (9), and oxalkylating the product to form an oxalkylate, where appropriate, to monoesterification with maleic anhydride and, where appropriate, to sulfation.

9. The process as claimed in claim 8, further comprising the step of subjecting the oxalkylate to monoesterification with maleic anhydride.

10. The process as claimed in claim 8, further comprising subjecting the oxalkylate to sulfation.

11. A solids dispersing agent comprising an addition compound as claimed in claim 1.

12. An aqueous liquids dispersing agent comprising an addition compound as claimed in claim 1.

13. A pigment preparation comprising
a) from 1 to 80% by weight of one or more pigments;
b) from 1 to 50% by weight of at least one addition compound as claimed in claim 1;
c) from 0 to 50% by weight of customary additives; and
d) from 10 to 80% by weight of water,
based in each case on the overall weight (100% by weight) of the pigment preparation.

14. A pigment preparation as claimed in claim 13, wherein the pigment is selected from the group consisting of monoazo pigments, disazo pigments, laked azo pigments, triphenylmethane pigments, thioindigo pigments, thiazineindigo pigments, perylene pigments, perinone pigments, anthanthrone pigments, diketopyrrolopyrrole pigments, dioxazine pigments, quinacridone pigments, phthalocyanine pigments, isoindolinone pigments, isoindoline pigments, benzimidazolone pigments, naphthol pigments quinophthalone pigments and carbon blacks.

15. A pigment preparation as claimed in claim 13, wherein the pigment is selected from the group consisting of titanium dioxides, zinc sulfides, iron oxides, chromium oxides, ultramarine, nickel or chromium antimony titanium oxides, cobalt oxides and bismuth vanadates.

16. A process for producing a pigment preparation as claimed in claim 13 comprising the step of adding at least one compound of formula (1)

(1)

in which
n is a number from 1 to 10;
$R^1$, $R^2$ are identical or different and are each a hydrogen atom or a saturated or unsaturated aliphatic radical having 1 to 4 carbon atoms;
$R^3$, $R^4$ are identical or different and are each a hydrogen atom or alkyl having 1 to 3 carbon atoms, and the bridge member is in each case positioned ortho or meta in relation to the phenolic oxygen atom;
Z is a group —CH$_2$—CH$_2$—, —CH$_2$—CH(CH$_3$)—, —CH(CH$_3$)—CH$_2$— or a combination thereof,
s is a number between 1 and 200,
B is hydrogen, —CO—CH=CH—COOM, —COCH(SO$_3$M)CH$_2$COOM, —CO—CH$_2$—CH(SO$_3$M)—COOM, —SO$_3$M, —SO$_2$M or —PO$_3$MM, M being a cation; and
Y is a radical of an amine of formula (4)

(4)

in which
$R^5$ is a saturated or singly or multiply unsaturated aliphatic radical having 6 to 30 carbon atoms,
A is phenylene or naphthylene,
p is zero or 1,
$R^6$, $R^7$ are each hydrogen or a methyl radical, but are not simultaneously a methyl radical, and
q is a number from 0 to 40;

and/or Y is a radical of an amine of the formula (5)

$$(H_2N-R^9)_{\overline{r}}-N(H)_{2-r}-R_8 \quad (5)$$

in which
r is a number from 0 to 2,
$R^8$ is a saturated or singly or multiply unsaturated aliphatic radical having 8 to 24 carbon atoms, and
$R^9$ is an alkylene group having 2 to 6 carbon atoms,
and/or Y is a radical of the amines of the formulae (6), (7), (8) and/or (9)

$$N-R^{10}-R^{13} \quad (6)$$

$$N-R^{11}-NR^{12}\!\!\!-\!\!(R^{10})_{\overline{t}}\!-\!R^{13} \quad (7)$$

$$R^{14}-N-R^{15} \quad (8)$$

(9)

in which
t is 0 or 1,
$R^{10}$ is an alkylene group having 1 to 10 carbon atoms,
$R^{11}$ is an alkylene group having from 2 to 6 carbon atoms,
$R^{12}$ is a hydrogen atom or an alkyl group having 1 to 4 carbon atoms,
$R^{13}$ is a saturated or a singly or multiply unsaturated, mononuclear or polynuclear heterocyclic or carbocyclic ring system having 3 to 18 carbon atoms,
$R^{14}$, $R^{15}$ are identical or different and are each a saturated or singly or multiply unsaturated aliphatic radical having 1 to 24 carbon atoms; and
$R^{16}$ together with the nitrogen atom of the formula (9) forms a 5- to 7-membered heterocyclic ring system, during pigment synthesis or during grinding, dispersing or finishing of the pigment.

17. An addition compound as claimed in claim 1, wherein $R^{13}$ contains in the ring 1, 2 or 3 further heteroatoms selected from the group of N, S and O.

18. An addition compound as claimed in claim 1, wherein the ring system is substituted by one or more of the radicals $R^{17}$, halogen atoms, —OR$^{17}$, —NR$^{17}$R$^{18}$, —COOR$^{17}$, —CONR$^{17}$R$^{18}$, —NR$^{17}$—COR$^{18}$, —NO$_2$, —CN or CF$_3$, $R^{17}$ and $R^{18}$ independently of one another being hydrogen or an alkyl radical having 1 to 10 carbon atoms.

19. An addition compound as claimed in claim 1, wherein $R^{16}$ together with the nitrogen atom of the formula (9) forms a 5- to 7- membered heterocyclic ring system containing in the ring 1, 2, or 3 further heteroatoms selected from the group consisting of N, S, and O.

20. An addition compound as claimed in claim 19, wherein the ring of $R^{16}$ is substituted by one or more of the radicals $R^{17}$, halogen atoms, —OR$^{17}$, —NR$^{17}$R$^8$, —COOR$^{17}$, —CONR$^{17}$R$^{18}$, —NR$^{17}$—COR$^{18}$, —NO$_2$, —CN or CF$_3$, $R^{17}$ and $R^{18}$ independently of one another being hydrogen or an alkyl radical having 1 to 10 carbon atoms.

21. An addition compound as claimed in claim 1, wherein s is a number from 10 to 40.

* * * * *